(12) United States Patent
Sasaki et al.

(10) Patent No.: US 10,720,706 B2
(45) Date of Patent: Jul. 21, 2020

(54) LOOP ANTENNA AND DESIGN METHOD FOR LOOP ANTENNA

(71) Applicant: Nippon Telegraph and Telephone Corporation, Tokyo (JP)

(72) Inventors: Ai-ichiro Sasaki, Atsugi (JP); Junichi Kodate, Atsugi (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 16/620,965

(22) PCT Filed: Jun. 8, 2018

(86) PCT No.: PCT/JP2018/021996
§ 371 (c)(1),
(2) Date: Dec. 10, 2019

(87) PCT Pub. No.: WO2018/235631
PCT Pub. Date: Dec. 27, 2018

(65) Prior Publication Data
US 2020/0203832 A1     Jun. 25, 2020

(30) Foreign Application Priority Data

Jun. 20, 2017    (JP) .................. 2017-120196

(51) Int. Cl.
*H01Q 7/08*      (2006.01)
*H04B 5/02*      (2006.01)
*H01Q 19/02*     (2006.01)

(52) U.S. Cl.
CPC ............... *H01Q 7/08* (2013.01); *H01Q 19/02* (2013.01); *H04B 5/02* (2013.01)

(58) Field of Classification Search
CPC ............. H01Q 7/08; H01Q 19/02; H04B 5/02
(Continued)

(56) References Cited

U.S. PATENT DOCUMENTS

2010/0045114 A1*   2/2010   Sample ................... H02J 5/005
                                                      307/104
2011/0281535 A1*   11/2011   Low ........................ H01F 38/14
                                                      455/129
(Continued)

FOREIGN PATENT DOCUMENTS

JP       2004-282403 A     10/2004
JP       2013-534074 A     8/2013
(Continued)

OTHER PUBLICATIONS

International Search Report, PCT Patent Application No. PCT/JP2018/021996, dated Aug. 7, 2018.
(Continued)

*Primary Examiner* — Andrea Lindgren Baltzell
(74) *Attorney, Agent, or Firm* — Kilpatrick Townsend & Stockton LLP

(57) ABSTRACT

Even when at least one of a capacitor ($C_1$) connected to a main loop and a capacitor ($C_2$) connected to an amplification loop cannot be set to an optimal value, a current value of a current ($I_2$) flowing on the amplification loop can be made sufficiently large by setting the capacitors ($C_1$, $C_2$) based on any of an optimal C2 curved line, an optimal C1 curved line, and an optimal C1 straight line that pass through an optimal point ($C_1^{opt}$, $C_2^{opt}$) of the capacitors ($C_1$, $C_2$) and extend along a ridge of contour lines each joining the points where the magnitude of the current ($I_2$) is equal on a diagram showing a relation of values of the capacitors ($C_1$, $C_2$) with the magnitude of the current ($I_2$).

10 Claims, 4 Drawing Sheets

(58) Field of Classification Search
USPC .................................................. 343/700 R
See application file for complete search history.

(56) References Cited

U.S. PATENT DOCUMENTS

| 2014/0154980 | A1* | 6/2014 | Jang ..................... H04B 5/0087 |
| | | | 455/41.1 |
| 2018/0277953 | A1 | 9/2018 | Sasaki et al. |
| 2018/0342806 | A1 | 11/2018 | Sasaki et al. |

FOREIGN PATENT DOCUMENTS

| JP | 2013-546291 A | 12/2013 |
| JP | 2014-117150 A | 6/2014 |
| JP | 5684695 B | 3/2015 |
| JP | 5813672 B2 | 11/2015 |
| JP | 5914368 B2 | 5/2016 |
| JP | 2016-174327 A | 9/2016 |
| JP | 6077036 B2 | 2/2017 |
| JP | 6077148 B1 | 2/2017 |

OTHER PUBLICATIONS

Written Opinion, PCT Patent Application No. PCT/JP2018/021996, dated Aug. 7, 2018.
International Preliminary Report on Patentability, PCT Patent Application No. PCT/JP2018/021996, dated Jan. 2, 2020 (Includes English translation of Written Opinion dated Aug. 7, 2018).

* cited by examiner

LOOP ANTENNA AND DESIGN METHOD FOR LOOP ANTENNA

TECHNICAL FIELD

The present invention relates to a loop antenna that can contribute to expansion of a coverage for a wireless system using a magnetic field.

BACKGROUND ART

In recent years, a service linked to an intention and an action of a user while purposely restricting an authentication area has been provided by using an authentication system adopting wireless communication techniques such as the near field communication (NFC) (Patent Documents 1 to 3). A loop antenna (a coil) is employed when forming the authentication area by using a magnetic field. A current applied to the antenna develops spherical magnetic field distribution on a surface of the antenna. A distance decay property of the magnetic field is shaper than that of an electric wave, and therefore has an advantage that it is possible to clearly mark off a boundary of a wireless coverage.

The sharp distance decay property of the magnetic field is a drawback from the viewpoint of expanding the wireless coverage. When expanding the wireless coverage in the wireless system using the magnetic field, a large current needs to be applied to the antenna, which may lead to a significant increase in power consumption.

A method of amplifying the magnetic field by using a magnetic field resonance effect without increasing a consumption current has been proposed as a mode of solving the aforementioned problem (Patent Documents 4 and 5).

PRIOR ART DOCUMENTS

Patent Documents

Patent document 1: Japanese Patent Publication No. 5684695
Patent document 2: Japanese Patent Publication No. 5914368
Patent document 3: Japanese Patent Publication No. 5813672
Patent document 4: Japanese Patent Publication No. 6077036
Patent document 5: Japanese Patent Publication No. 6077148

SUMMARY OF THE INVENTION

Problem to be Solved by the Invention

In order to amplify the magnetic field by using the resonance, capacitances of capacitors that are fitted to two tightly coupled loop antennas, respectively, need to be set to appropriate values. A variable capacitor is convenient in order to set the capacitance of such a capacitor to an optimal value. On a practical point of view, the use of a fixed capacitor is required to meet the needs for reliability and cost reduction.

However, it is difficult to set the capacitance of the fixed capacitor to the optimal value. For this reason, there has been a demand for a method of obtaining a relatively large magnetic field even if the capacitances of the capacitors do not completely match the optimal values.

The present invention has been made in view of the aforementioned circumstances and an objective thereof is to obtain a relatively large magnetic field even if a capacitance value of a capacitor attached to an antenna does not completely match an optimal value.

Means for Solving the Problem

A loop antenna according to an aspect of the present invention includes: a main loop being an open loop connected to any of a signal source and a reception circuit; an amplification loop being a closed loop having the same shape as the main loop; a first resistor connected in series to the main loop; a first capacitor connected in series to the main loop; a second resistor connected in series to the amplification loop; and a second capacitor connected in series to the amplification loop. Here, the main loop and the amplification loop have equal self-inductance. A resistance value of the first resistor is a larger value than a resistance value of the second resistor. At least one of the first capacitor and the second capacitor is a fixed capacitor. A magnitude of a current flowing on the amplification loop is expressed by using the resistance value of the first resistor, the resistance value of the second resistor, a capacitance value of the first capacitor, a capacitance value of the second capacitor, and the self-inductance. A combination of the capacitance value of the first capacitor and the capacitance value of the second capacitor to maximize the magnitude of the current is expressed by any of an optimal curved line and an optimal straight line each of which passes through an optimal point indicated with the capacitance value of the first capacitor and the capacitance value of the second capacitor when the magnitude of the current is maximized in orthogonal coordinates adopting the capacitance value of the first capacitor and the capacitance value of the second capacitor as respective axes. The combination of the capacitance value of the first capacitor and the capacitance value of the second capacitor is determined based on any of the optimal curved line and the optimal straight line.

Effect of the Invention

According to the present invention, it is possible to obtain a relatively large magnetic field even if a capacitance value of a capacitor attached to an antenna does not completely match an optimal value.

MODE FOR CARRYING OUT THE INVENTION

An embodiment of the present invention will be described below with reference to the drawings.

Figure 1:
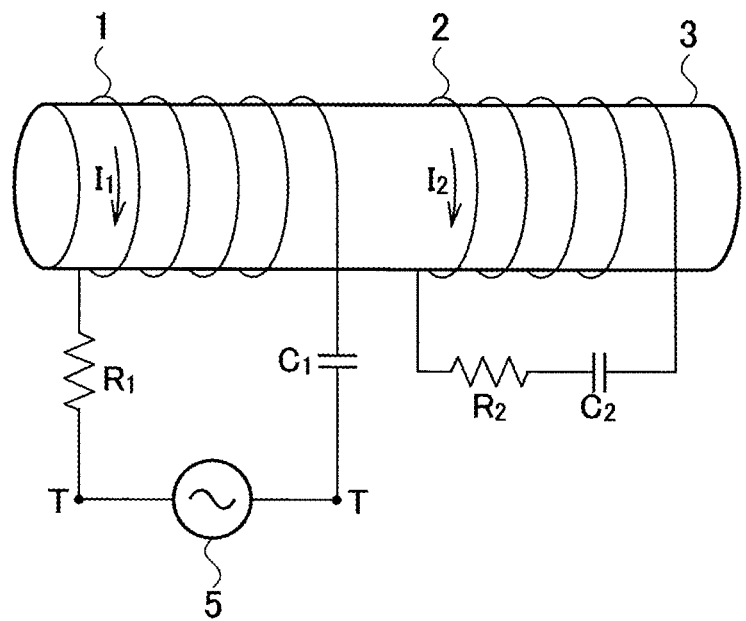
FIG. 1 is a diagram showing a configuration of a loop antenna of an embodiment of the present invention.

FIG. 1 is a diagram showing a configuration of a loop antenna of this embodiment.

The loop antenna shown in FIG. 1 is a resonant-type loop antenna which includes a main loop 1 and an amplification loop 2.

The main loop 1 is a coil wound around a bar-shaped rod 3 made of either a magnetic body or an insulating body. The number of turns in the main loop 1 is at least 1 and the number of turns is 5 in the example of FIG. 1. A resistor $R_1$ and a capacitor $C_1$ are connected in series to the main loop 1. The main loop 1 is an open loop that includes terminals T and T for establishing connection to a signal source 5 or a reception circuit (not shown).

The amplification loop 2 is a coil wound around the rod 3 at a position away from the main loop 1. The number of turns in the amplification loop 2 is at least 1 and the number of turns is 5 in the example of FIG. 1. A resistor $R_2$ and a capacitor $C_2$ are connected in series to the amplification loop 2. The amplification loop 2 is a closed loop that does not include any terminals.

The main loop 1 and the amplification loop 2 have the same geometric shape. Accordingly, both loops have equal self-inductance L. Here, the main loop 1 and the amplification loop 2 may be wound at the same position on the rod 3.

When an alternating current $I_1$ is supplied from the signal source 5 to the main loop 1, an alternating current $I_2$ flows on the amplification loop 2 due to mutual inductance between the main loop 1 and the amplification loop 2. If a resistance value of the resistor $R_2$ is set smaller than a resistance value of the resistor $R_1$, the magnitude of the current $I_2$ becomes larger than the magnitude of the current $I_1$. Thus, it is possible to expand an area of a magnetic field generated by the loop antenna.

While FIG. 1 illustrates a configuration to use the loop antenna as a transmission antenna by connecting the signal source 5 to the terminals T and T of the main loop 1, the loop antenna may be used as a reception antenna by connecting the reception circuit to the terminals T and T instead of the signal source 5. In this case, a large current $I_2$ is accumulated in the amplification loop 2 by way of the magnetic field received from outside. Due to the presence of the mutual inductance, the current $I_1$ flowing on the main loop 1 becomes larger as compared to the case where the amplification loop 2 is not present. Thus, the area of the magnetic field appears to be expanded when viewed from the transmission side.

Next, optimal values of the capacitors $C_1$ and $C_2$ for maximizing the current $I_2$ will be described.

The magnitude of the current $I_2$ relies on multiple factors including a frequency f of a signal generated by the signal source 5, the resistor $R_1$, the resistor $R_2$, the capacitor $C_1$, the capacitor $C_2$, the shape of the loop, and so forth. For this reason, it is preferable to maximize the current $I_2$ by adjusting respective values of the resistor $R_1$, the resistor $R_2$, the capacitor $C_1$, the capacitor $C_2$.

If the value of the resistor $R_2$ is smaller than the value of the resistor $R_1$, the current $I_2$ can be maximized by setting the values of the capacitors $C_1$ and $C_2$ to optimal values $C_1^{opt}$ and $C_2^{opt}$ defined by the following formulae (1) and (2):

$$C_1^{opt}(\omega, L, R_1, R_2) := \frac{1}{\omega^2 L}\left\{1 + \sqrt{\frac{R_1}{R_2} - \left(\frac{R_1}{\omega L}\right)^2}\right\}^{-1} \quad (1)$$

$$C_2^{opt}(\omega, L, R_1, R_2) := \frac{1}{\omega^2 L}\left\{1 + \sqrt{\frac{R_2}{R_1} - \left(\frac{R_2}{\omega L}\right)^2}\right\}^{-1} \quad (2)$$

where ω is an angular frequency of the signal generated by the signal source 5.

Figure 2:
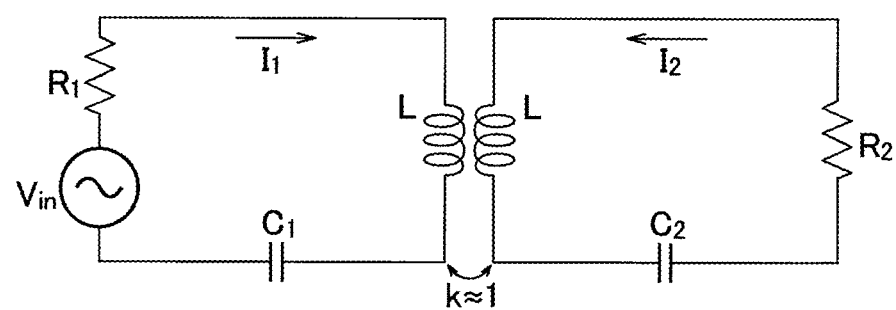
FIG. 2 is a diagram showing an equivalent circuit of the loop antenna of FIG. 1.

The magnitude of the current $I_2$ can be easily obtained by analyzing or simulating an equivalent circuit of the loop antenna of FIG. 1. FIG. 2 shows the equivalent circuit of the loop antenna of FIG. 1.

Figure 3:
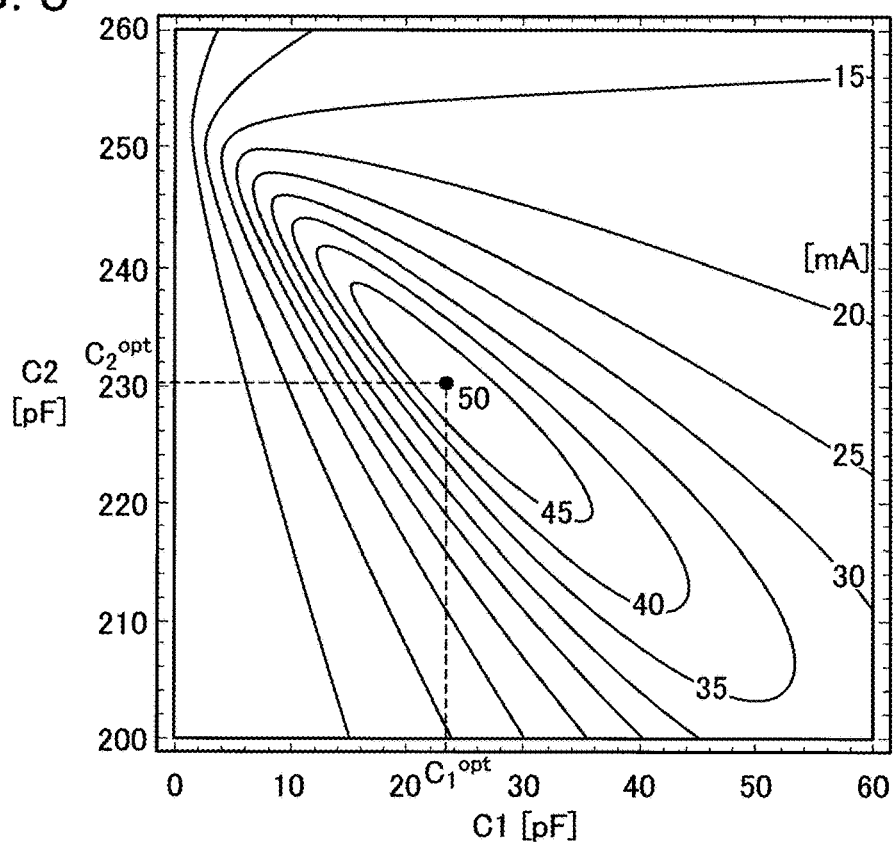
FIG. 3 is a diagram showing a relation of capacitance values of capacitors connected to a main loop and to an amplification loop with a current flowing on the amplification loop.

FIG. 3 shows a relation of the values of the capacitors $C_1$ and $C_2$ and the magnitude of the current $I_2$ obtained by analyzing the equivalent circuit of FIG. 2. FIG. 3 plots a result of analysis of the equivalent circuit while setting the frequency f of the signal generated by the signal source 5 to 10 MHz, a voltage Vin to 1 V, the self-inductance L of the main loop 1 and the amplification loop 2 to 1 μH, the resistor $R_1$ to 100Ω, and the resistor $R_2$ to 1Ω. In FIG. 3, the horizontal axis and the vertical axis indicate the values of the capacitors $C_1$ and $C_2$, respectively, and the relation of the values of the capacitors $C_1$ and $C_2$ with the magnitude of the current $I_2$ is indicated by using contour lines each joining points of equal values of the magnitude of the current $I_2$ (contour lines of the current $I_2$).

The optimal values $C_1^{opt}$ and $C_2^{opt}$ of the capacitors $C_1$ and $C_2$ defined by the following formula (3) are obtained by applying the above-mentioned conditions to the formulae (1) and (2).

$$C_1^{opt} = 23.3[pF], C_2^{opt} = 230.5[pF] \quad (3)$$

As shown in FIG. 3, it is apparent the current $I_2$ reaches the maximum (50 mA) indeed when the values of the capacitors $C_1$ and $C_2$ satisfy the formula (3). In other words, in order to maximize the current $I_2$, it is necessary to apply variable capacitors to both of the capacitors $C_1$ and $C_2$ and to bring the capacitance values of the capacitors $C_1$ and $C_2$ completely in line with the values of the formula (3) by conducting fine adjustment.

However, it may not be possible to set the capacitors $C_1$ and $C_2$ to the optimal values $C_1 o^{pt}$ and $C_2 Op^t$ if a fixed capacitor is used for at least one of the capacitors $C_1$ and $C_2$. This embodiment seeks an optimal value with which it is possible to maximize the current $I_2$ when using the fixed capacitor for at least one of the capacitors $C_1$ and $C_2$, and determines the capacitance values of the capacitors $C_1$ and $C_2$ based on the optimal value.

A case of using the fixed capacitor for the capacitor $C_1$ and using the variable capacitor for the capacitor $C_2$ will be considered to begin with. In other words, the value of the capacitor $C_1$ cannot be fine-adjusted but the value of the capacitor $C_2$ can be fine-adjusted.

By analyzing the equivalent circuit of FIG. 2, it is possible to express the current $I_2$ as a function of the capacitors $C_1$ and $C_2$. Hence, an equation defined by the following formula (4) will be considered.

$$\frac{\partial |I_2|}{\partial C_2} = 0 \quad (4)$$

The following formula (5) is obtained by specifically calculating and solving the formula (4) for the capacitor $C_2$.

$$C_2 = f(C_1; \omega, L, R_1) \tag{5}$$

where a function $f(C; \omega, L, R)$ is defined by the following formula (6):

$$f(C; \omega, L, R) := \frac{1 + \omega^2 C\{CR^2 + L(\omega^2 LC - 2)\}}{\omega^2 L\{1 - \omega^2 C(L - CR^2)\}} \tag{6}$$

Figure 4:
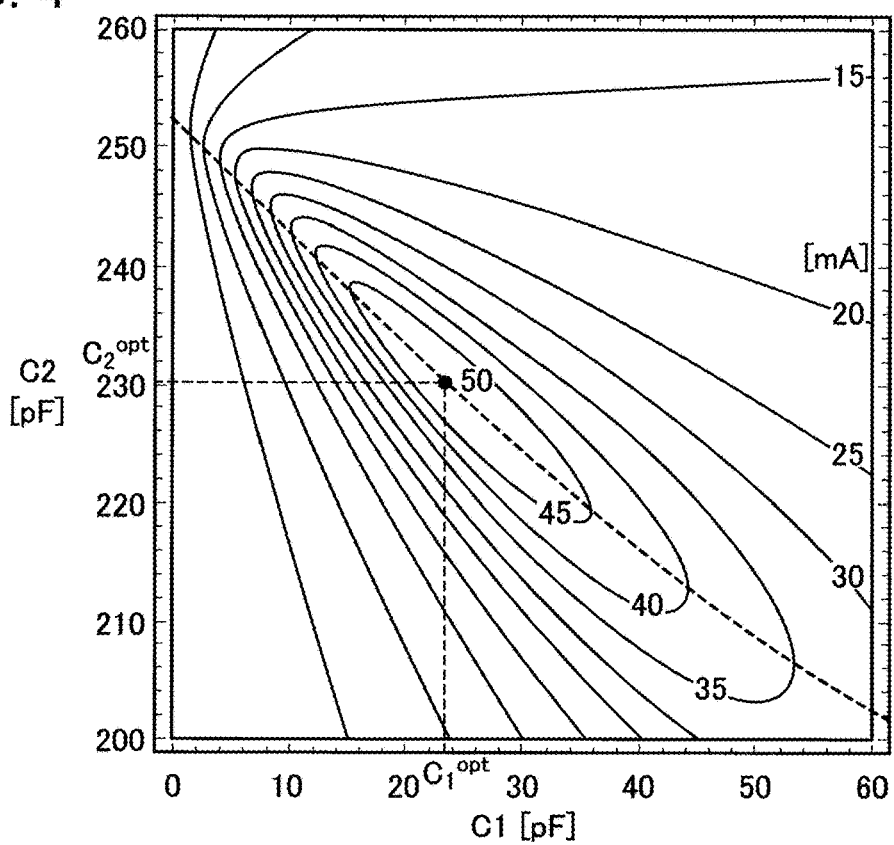
FIG. 4 is a diagram showing a curved line indicating an optimal capacitance value of the capacitor in the amplification loop when a fixed capacitor is connected to the main loop.

A curved line expressed by the formula (5) will be hereinafter referred to as an optimal C2 curved line. FIG. 4 is a diagram plotting the optimal C2 curved line over the contour lines shown in FIG. 3. The optimal C2 curved line represents an optimal value of the capacitor $C_2$ corresponding to the value of the capacitor $C_1$ of which the capacitance value is not adjustable. In other words, even when the value of the capacitor $C_1$ cannot be adjusted to the optimal value defined by the formula (3) since the capacitor $C_1$ is the fixed capacitor, it is possible to maximize the magnitude of the current $I_2$ by adjusting the value of the capacitor $C_2$ to the value obtained by the formula (5).

Next, a case of using the variable capacitor for the capacitor $C_1$ and using the fixed capacitor for the capacitor $C_2$ will be considered. In other words, in contrast to the aforementioned case, the value of the capacitor $C_1$ can be fine-adjusted but the value of the capacitor $C_2$ cannot be fine-adjusted.

In this case, an equation defined by the following formula (7) will be considered.

$$\frac{\partial |I_2|}{\partial C_1} = 0 \tag{7}$$

The following formula (8) is obtained by specifically calculating and solving the formula (7) for the capacitor $C_1$.

$$C_1 = f(C_2; \omega, L, R_2) \tag{8}$$

where the function $f(C; \omega, L, R)$ is defined by the formula (6).

Figure 5:
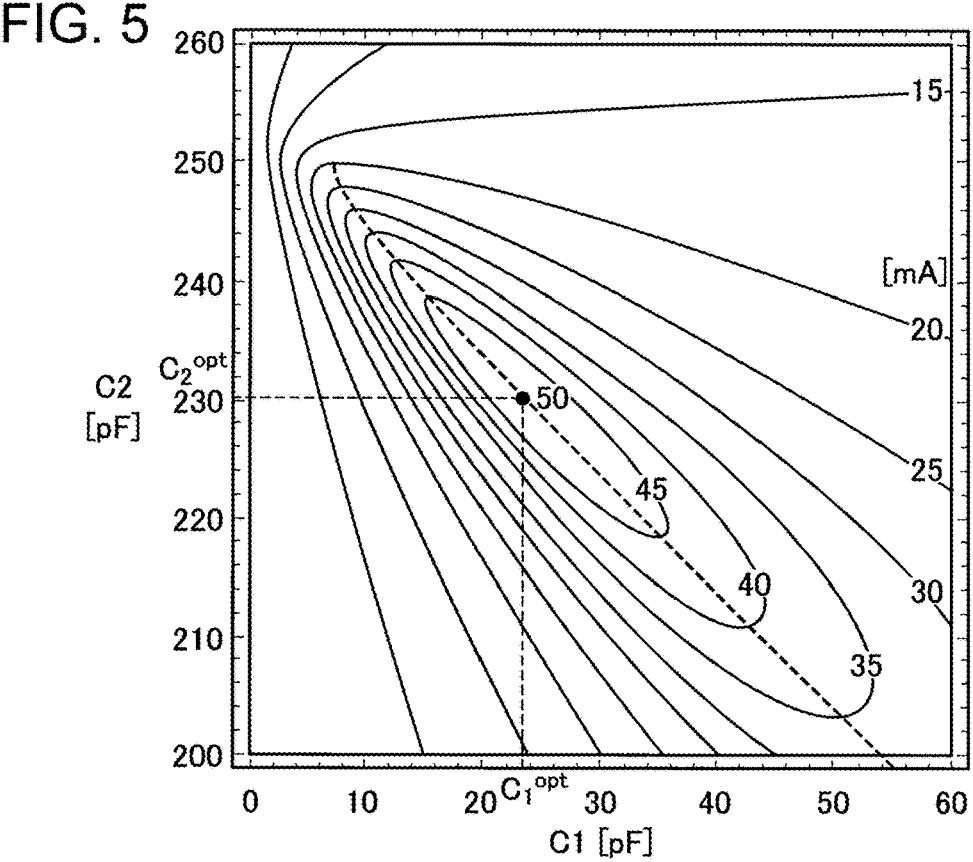
FIG. 5 is a diagram showing a curved line indicating an optimal capacitance value of the capacitor in the main loop when a fixed capacitor is connected to the amplification loop.

A curved line expressed by the formula (8) will be hereinafter referred to as an optimal C1 curved line. FIG. 5 is a diagram plotting the optimal C1 curved line over the contour lines shown in FIG. 3. The optimal C1 curved line represents an optimal value of the capacitor $C_1$ corresponding to the value of the capacitor $C_2$ of which the capacitance value is not adjustable. Even when the capacitor $C_2$ is the fixed capacitor, it is possible to maximize the magnitude of the current $I_2$ by fine-adjusting the value of the capacitor $C_1$ to the value obtained by the formula (8).

With reference to FIGS. 4 and 5, each of the optimal C2 curved line and the optimal C1 curved line is a curved line that passes through an optimal point $(C_1^{opt}, C_2^{opt})$ of the capacitors $C_1$ and $C_2$ to maximize the magnitude of the current $I_2$ and extends along a ridge of the contour lines of the current $I_2$.

In the meantime, with reference to FIG. 5, it turns out that the optimal $C_1$ curved line can be approximated to a straight line that passes through the optimal point $(C_1^{opt}, C_2^{opt})$ and has a slope equal to −1. This straight light is expressed by the following formula (9):

$$C_2 = -C_1 + C_1^{opt}(\omega, L, R_1, R_2) + C_2^{opt}(\omega, L, R_1, R_2) \tag{9}$$

Figure 6:
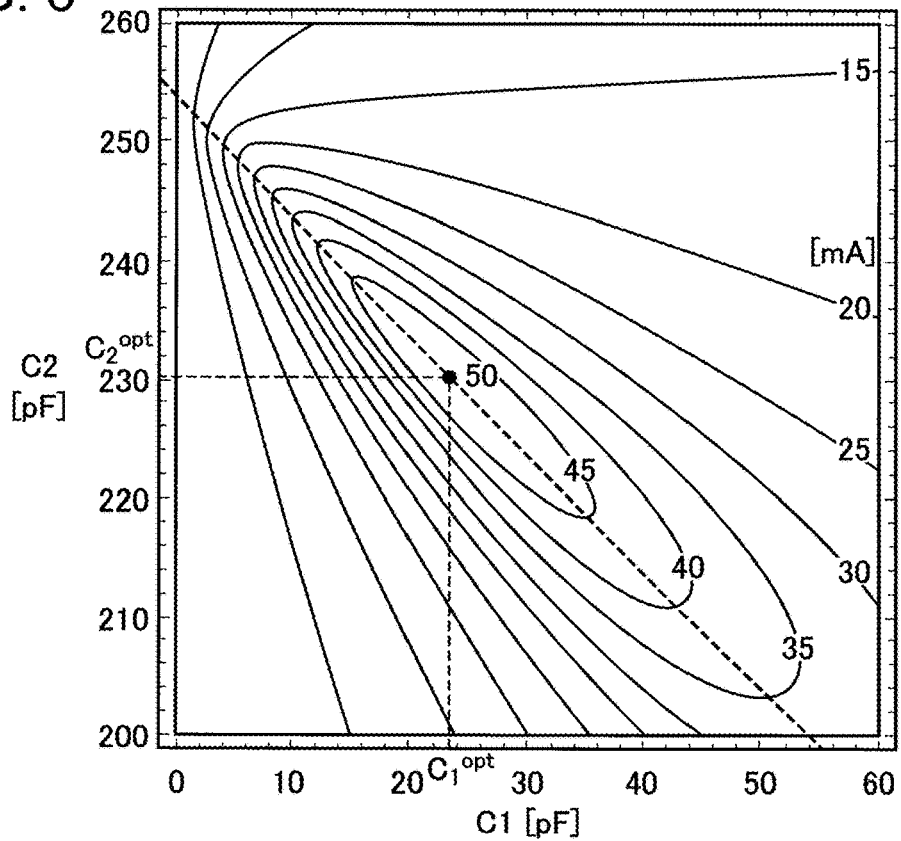
FIG. 6 is a diagram showing a straight line obtained by approximating the curved line in FIG. 5.

A straight line expressed by the formula (9) will be hereinafter referred to as an optimal C1 straight line. FIG. 6 is a diagram plotting the optimal C1 straight line over the contour lines shown in FIG. 3. With reference to FIG. 6, it is apparent that the optimal C1 straight line is well approximated to the optimal C1 curved line shown in FIG. 5. It is therefore possible to use the optimal C1 straight line in place of the optimal C1 curved line. Even when the capacitor $C_2$ is the fixed capacitor, it is possible to maximize the magnitude of the current $I_2$ by fine-adjusting the value of the capacitor $C_1$ to the value obtained by the formula (9). The value of the capacitor $C_1$ to be set can be obtained easily by using the optimal C1 straight line. The optimal C1 straight line is useful when automatically controlling the value of the capacitor $C_1$.

Next, a case of using the fixed capacitors for both of the capacitors $C_1$ and $C_2$ will be considered.

It is conceivable that no variable capacitors are used at all in order to achieve cost reduction. The fixed capacitors can be selected from a lineup standardized among manufacturers which ranges from E3 series to E192 series. However, the capacitors $C_1$ and $C_2$ have to be selected from the fixed capacitors having discrete values, and it is almost impossible to select the fixed capacitors that completely match the optimal values of the capacitors $C_1$ and $C_2$. In addition, it is also extremely difficult to obtain the fixed capacitors to be used for the capacitors $C_1$ and $C_2$ such that the values of the capacitors $C_1$ and $C_2$ are located on the optimal curved line or the optimal straight line described above.

Given the situation, when using the fixed capacitors for both of the capacitors $C_1$ and $C_2$, this embodiment adopts a combination $(C_1^0, C_2^0)$ of the capacitors out of combinations of capacitor candidates, with which a distance $d(C_1^0, C_2^0)$ from either the optimal curved line or the optimal straight line becomes shortest. The functions to represent the optimal curved lines and the optimal straight line have been given by the formulae (5), (6), (8), and (9) and it is therefore possible to obtain the distance $d(C_1^0, C_2^0)$ therefrom. In particular, the distance from the optimal C1 straight line indicated by the formula (9) can be easily obtained by using the following formula (10):

$$d(C_1^0, C_2^0) = \frac{|C_1^0 + C_2^0 - C_1^{opt} - C_2^{opt}|}{\sqrt{2}} \tag{10}$$

Next, another loop antenna of this embodiment will be described.

Figure 7:
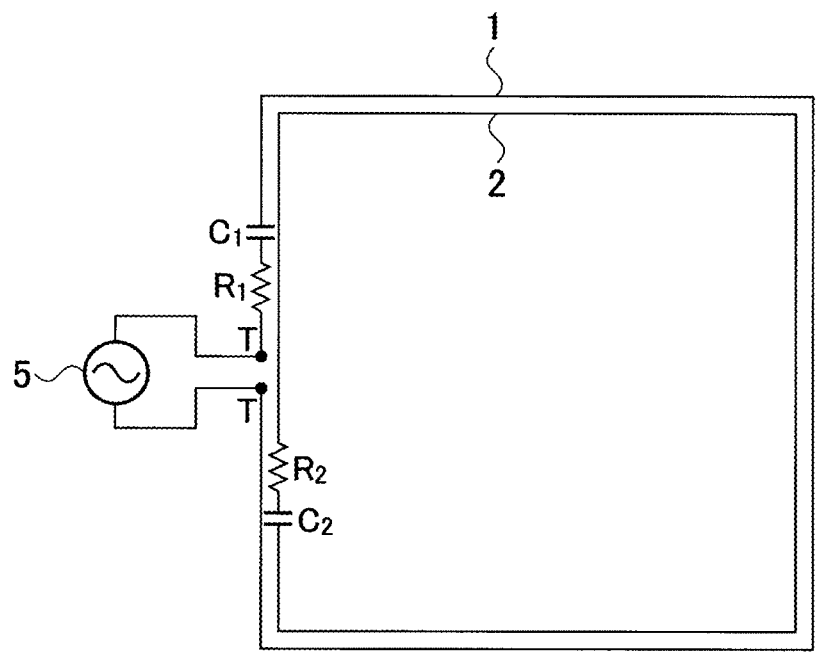
FIG. 7 is a diagram showing a configuration of another loop antenna according to the embodiment.

FIG. 7 is a diagram showing a configuration of another loop antenna of this embodiment.

The loop antenna shown in FIG. 7 is a resonant-type loop antenna which includes the main loop 1 and the amplification loop 2.

The loop antenna shown in FIG. 7 is different from the loop antenna shown in FIG. 1 in that the main loop 1 and the amplification loop are formed on a planar substrate (not shown).

The main loop 1 is disposed on the planar substrate made of an insulating body. The resistor $R_1$ and the capacitor $C_1$ are connected in series to the main loop 1. The main loop 1 is the open loop that includes the terminals T and T for establishing connection to the signal source 5 or the reception circuit (not shown).

The amplification loop 2 is disposed on the same planar substrate very closely to the main loop 1. The resistor $R_2$ and the capacitor $C_2$ are connected in series to the amplification loop 2. The amplification loop 2 is the closed loop that does not include any terminals.

The main loop 1 and the amplification loop 2 have the same geometric shape. Accordingly, both loops have equal self-inductance L.

When the alternating current $I_1$ is supplied from the signal source 5 to the main loop 1, the alternating current $I_2$ flows on the amplification loop 2 due to the mutual inductance between the main loop 1 and the amplification loop 2. If the resistance value of the resistor $R_2$ is set smaller than the resistance value of the resistor $R_1$, the magnitude of the current $I_2$ becomes larger than the magnitude of the current $I_1$.

Even when the fixed capacitor is used for at least one of the capacitors $C_1$ and $C_2$ in the loop antenna of FIG. 7, it is possible to maximize the magnitude of the current $I_2$ by setting the optimal value as with the case of the loop antenna of FIG. 1.

Though the amplification loop 2 is located inside the main loop 1 in FIG. 7, the amplification loop 2 may be located outside the main loop 1, or the main loop 1 and the amplification loop 2 may be located on two sides while interposing the planar substrate in between. The number of turns in each of the main loop 1 and the amplification loop 2 may be set to 2 or above. When the number of turns is set to 2 or above, the numbers of turns in the main loop 1 and the amplification loop 2 are set equal.

The loop antenna of FIG. 7 may also be used as the reception antenna by connecting the reception circuit to the terminals T and T.

As described above, according to this embodiment, even when at least one of the capacitor $C_1$ connected to the main loop 1 and the capacitor $C_2$ connected to the amplification loop 2 cannot be set to the optimal value, a current value of the current $I_2$ flowing on the amplification loop can be made sufficiently large by setting the capacitors $C_1$ and $C_2$ based on any of the optimal C2 curved line, the optimal C1 curved line, and the optimal C1 straight line that pass through the optimal point of the capacitors $C_1$ and $C_2$ and extend along the ridge of the contour lines each joining the points where the magnitude of the current $I_2$ is equal on the diagram showing the relation of the values of the capacitors $C_1$ and $C_2$ with the magnitude of the current $I_2$. For this reason, it is possible to obtain a large magnetic field amplification effect even when an inexpensive fixed capacitor is used for at least one of the capacitors $C_1$ and $C_2$.

EXPLANATION OF THE REFERENCE NUMERALS 1 main loop
2 amplification loop
3 rod
5 signal source

The invention claimed is:

1. A loop antenna comprising:
a main loop being an open loop connected to any of a signal source and a reception circuit;
an amplification loop being a closed loop having the same shape as the main loop;
a first resistor connected in series to the main loop;
a first capacitor connected in series to the main loop;
a second resistor connected in series to the amplification loop; and
a second capacitor connected in series to the amplification loop, wherein
the main loop and the amplification loop have equal self-inductance,
a resistance value of the first resistor is a larger value than a resistance value of the second resistor,
at least one of the first capacitor and the second capacitor is a fixed capacitor,
a magnitude of a current flowing on the amplification loop is expressed by using the resistance value of the first resistor, the resistance value of the second resistor, a capacitance value of the first capacitor, a capacitance value of the second capacitor, and the self-inductance,
a combination of the capacitance value of the first capacitor and the capacitance value of the second capacitor to maximize the magnitude of the current is expressed by any of an optimal curved line and an optimal straight line each of which passes through an optimal point indicated with the capacitance value of the first capacitor and the capacitance value of the second capacitor when the magnitude of the current is maximized in orthogonal coordinates adopting the capacitance value of the first capacitor and the capacitance value of the second capacitor as respective axes, and
the combination of the capacitance value of the first capacitor and the capacitance value of the second capacitor is determined based on any of the optimal curved line and the optimal straight line.

2. The loop antenna according to claim 1, wherein
the first capacitor is the fixed capacitor, and
the optimal curved line is expressed by a formula defined as:

$$C_2 = f(C_1; \omega, L, R_1)$$
$$f(C; \omega, L, R) := \frac{1 + \omega^2 C\{CR^2 + L(\omega^2 LC - 2)\}}{\omega^2 L\{1 - \omega^2 C(L - CR^2)\}}$$

where $C_1$ is the capacitance value of the first capacitor, $C_2$ is the capacitance value of the second capacitor, L is the self-inductance of the main loop and the amplification loop, ω is an angular frequency of a signal to be applied to the main loop, and $R_1$ is the resistance value of the first resistor.

3. The loop antenna according to claim 1, wherein
the second capacitor is the fixed capacitor, and
the optimal curved line is expressed by a formula defined as:

$$C_1 = f(C_2; \omega, L, R_2)$$
$$f(C; \omega, L, R) := \frac{1 + \omega^2 C\{CR^2 + L(\omega^2 LC - 2)\}}{\omega^2 L\{1 - \omega^2 C(L - CR^2)\}}$$

where $C_1$ is the capacitance value of the first capacitor, $C_2$ is the capacitance value of the second capacitor, L is the self-inductance of the main loop and the amplification loop, ω is an angular frequency of a signal to be applied to the main loop, and $R_2$ is the resistance value of the second resistor.

4. The loop antenna according to claim 1, wherein
the second capacitor is the fixed capacitor, and
the optimal straight line is a straight line passing through the optimal point and having a slope equal to −1.

5. The loop antenna according to claim 2, wherein
the second capacitor is a variable capacitor, and
the capacitance value of the variable capacitor is adjusted to a value obtained by using the capacitance value of the fixed capacitor and the optimal curved line.

6. The loop antenna according to claim 1, wherein
both of the first capacitor and the second capacitor are the fixed capacitors, and
the combination of the capacitance value of the first capacitor and the capacitance value of the second capacitor is a combination in which a distance from a point indicated with the capacitance value of the first capacitor and the capacitance value of the second capacitor to any of the optimal curved line and the optimal straight line is shortest.

7. The loop antenna according to claim 1, wherein the capacitance value of the first capacitor and the capacitance value of the second capacitor are values on any of the optimal curved line and the optimal straight lines.

8. A design method for a loop antenna provided with
a main loop being an open loop connected to any of a signal source and a reception circuit,
an amplification loop being a closed loop having the same shape as the main loop,
a first resistor connected in series to the main loop,
a first capacitor connected in series to the main loop,
a second resistor connected in series to the amplification loop, and
a second capacitor connected in series to the amplification loop, wherein
the main loop and the amplification loop have equal self-inductance,
a resistance value of the first resistor is a larger value than a resistance value of the second resistor,
at least one of the first capacitor and the second capacitor is a fixed capacitor,
a magnitude of a current flowing on the amplification loop is expressed by using the resistance value of the first resistor, the resistance value of the second resistor, a capacitance value of the first capacitor, a capacitance value of the second capacitor, and the self-inductance,
a combination of the capacitance value of the first capacitor and the capacitance value of the second capacitor to maximize the magnitude of the current is expressed by any of an optimal curved line and an optimal straight line each of which passes through an optimal point indicated with the capacitance value of the first capacitor and the capacitance value of the second capacitor when the magnitude of the current is maximized in orthogonal coordinates adopting the capacitance value of the first capacitor and the capacitance value of the second capacitor as respective axes, and
the method includes determining the combination of the capacitance value of the first capacitor and the capacitance value of the second capacitor based on any of the optimal curved line and the optimal straight line.

9. The loop antenna according to claim 3, wherein
the first capacitor is a variable capacitor, and
the capacitance value of the variable capacitor is adjusted to a value obtained by using the capacitance value of the fixed capacitor and the optimal curved line.

10. The loop antenna according to claim 4, wherein
the first capacitor is a variable capacitor, and
the capacitance value of the variable capacitor is adjusted to a value obtained by using the capacitance value of the fixed capacitor and the optimal straight line.

* * * * *